United States Patent [19]

Yoshida

[11] Patent Number: 4,870,501
[45] Date of Patent: Sep. 26, 1989

[54] IMAGE READOUT APPARATUS

[75] Inventor: Tekehiro Yoshida, Tokyo, Japan

[73] Assignee: Canon Kabushiki Kaisha, Tokyo, Japan

[21] Appl. No.: 41,076

[22] Filed: Apr. 21, 1987

[30] Foreign Application Priority Data

Apr. 24, 1986 [JP] Japan .................................. 61-95485
May 28, 1986 [JP] Japan .................................. 61-123019

[51] Int. Cl.$^4$ ............................................. H04N 1/40
[52] U.S. Cl. .................................... 358/284; 358/461; 358/494; 382/54
[58] Field of Search ............... 358/280, 282, 284, 293; 382/54; 250/578

[56] References Cited

U.S. PATENT DOCUMENTS

| | | | |
|---|---|---|---|
| 4,133,008 | 1/1979 | Tisue .................. | 358/282 |
| 4,420,742 | 12/1983 | Tadauchi et al. .................. | 358/282 |
| 4,578,711 | 3/1986 | White et al. .................. | 358/282 |
| 4,594,733 | 6/1986 | Kanzaki et al. .................. | 358/282 |

Primary Examiner—Edward L. Coles, Sr.
Attorney, Agent, or Firm—Fitzpatrick, Cella, Harper & Scinto

[57] ABSTRACT

An image readout apparatus for photoelectrically reading an image of an original document which is suitable for use in a facsimile apparatus to transmit and receive the image data of the original document. This apparatus includes: a CCD image sensor to read an image and generate electric data indicative of the image; a reference white plate; a memory to store the reference data obtained by reading the white plate by the image sensor; a correction circuit to correct the image data obtained by reading an original document with the image sensor on the basis of the reference data stored in the memory; and a control circuit for allowing the white plate to be read by the image sensor and allowing the reference data to be stored in the memory even when the original document cannot be read by the image sensor. When the time required to read the original document with the image sensor is above a predetermined time, on the other hand, the control circuit allows the white plate to be read by the image sensor and allows the reference data to be stored in the memory. With this apparatus, the proper slice level is set and a good readout image can be derived.

34 Claims, 14 Drawing Sheets

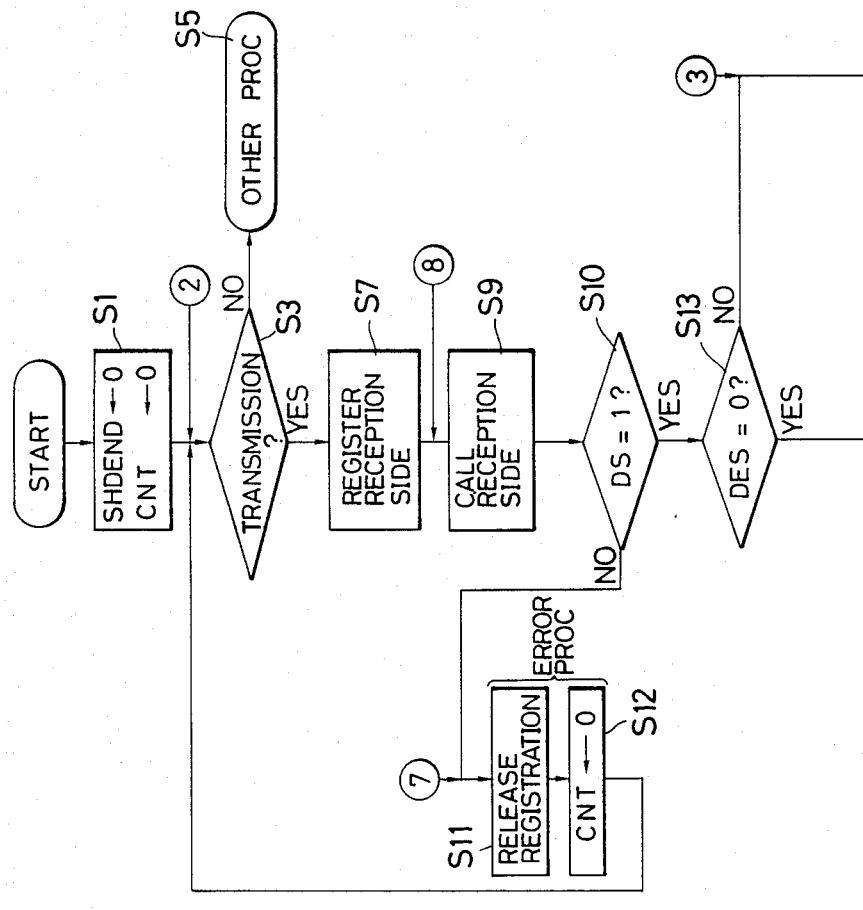

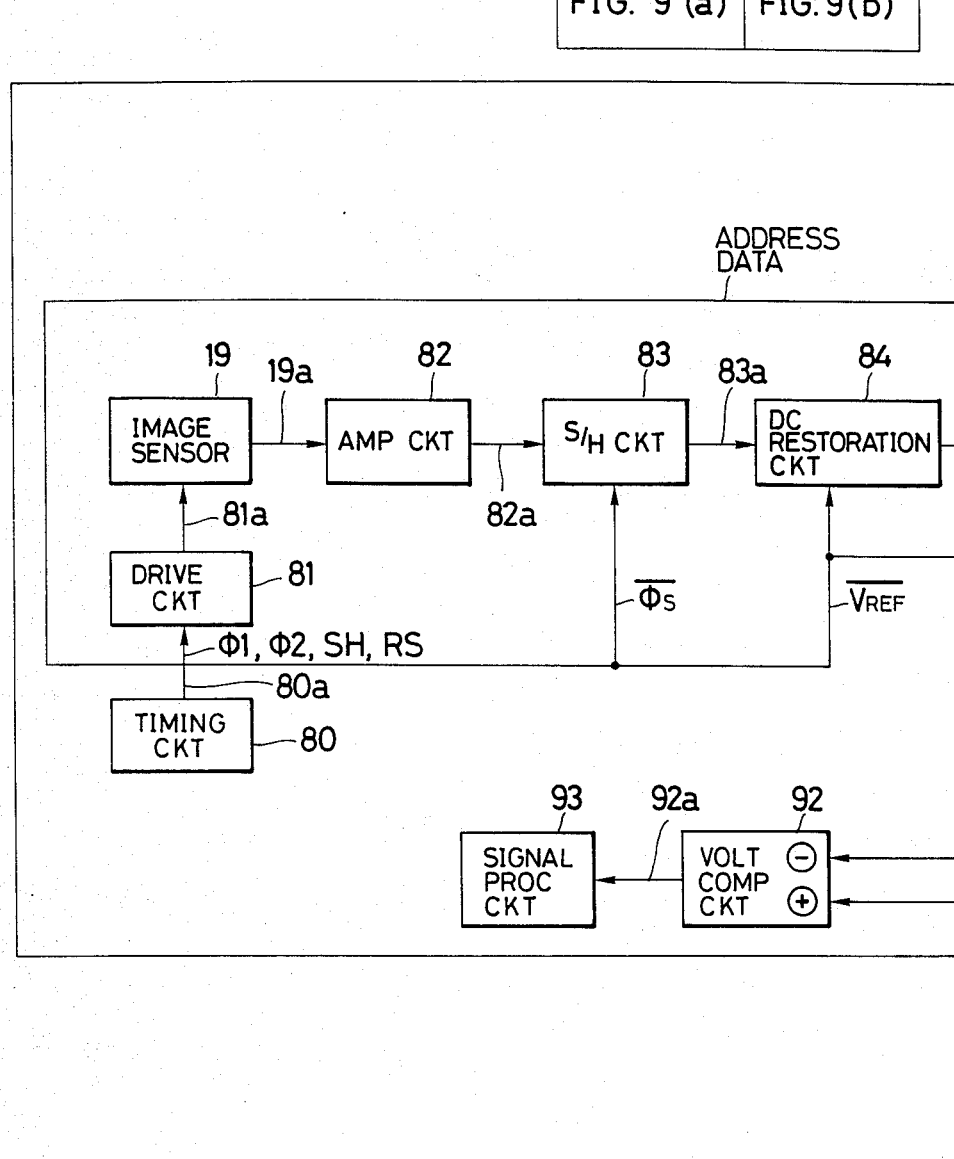

IMAGE READOUT APPARATUS

BACKGROUND OF THE INVENTION

1. Field of the Invention

The present invention relates to an image readout apparatus for photoelectrically reading an image of an original document and, more particularly, to an image readout apparatus suitable for use in a facsimile apparatus for transmitting and receiving image data indicative of an image of an original document.

2. Related Background Art

The image readout apparatus provided in facsimile apparatus, digital copying apparatus, or the like is constituted so as to photoelectrically read an image of an original document in such a manner that the intensity of the reflected light from the original document exposed by a light source is detected by an image sensor such as a CCD line sensor or the like.

In general, shading correction is performed because the sensitivity of the original document readout sensor, the illumination of the illumination light source, and the like are not constant.

In the image processing to binarize an analog image signal on the basis of a proper level, hitherto, it has been proposed that the binarization level be changed in consideration of the shading in U.S. application Ser. No. 873,066 for example.

Namely, to cope with a fluctuation in light amount at a fluorescent lamp or lens (i.e., the peripheral light amount decreases), the slice level is determined in accordance with the fluctuation in the light amount without binarizing by a constant slice level.

In the actual facsimile apparatus or the like, just before an original document to be transmitted reaches the readout position, a reference white plate is scanned and the all white-signal is read out (hereinafter, this scanning operation is referred to as a prescan). A video signal waveshape corresponding to the light amount distribution at that time is stored. The slice level is determined using the stored video signal waveshape as a reference.

On the other hand, image transmission apparatuses having an original document feeding mechanism generally include two kinds of apparatuses: one is an apparatus wherein after a signal indicative of the communication link such as a signal representative of the non-voice terminal from a distant side receiver, an initial identification signal, or the like was detected, the feeding operation of an original document is started; the other is an apparatus wherein an original document is previously fed before the communication link is constructed.

According to the former apparatus, the transmission is started a predetermined period of time after the communication link is constructed so that a long period of time may be wasted.

In the case of the latter apparatus, although time can be effectively used, a problem occurs when the communication link is not constructed because the receiver is busy. When the communication link is not constructed, the reception side is ordinarily called again after a predetermined time has elapsed. However, if the original document moves during this time, the apparatus cannot accurately detect the edge position of the original document.

Therefore, as mentioned above, the reflected light from the reference white plate for the shading correction is sensed just before the readout operation of the original document is started. However, when the reception side is again called, the edge position of the original document cannot be detected as mentioned above. Therefore, it is unclear whether the white plate is read by the prescan operation or the original document itself is read out. Thus, there is the case where the original document is read by the prescan. In such a case, the shading correction cannot be accurately performed.

On the other hand, when the original document is deeply inserted beyond the readout position, the reference white plate is covered by the original document, so that the prescan cannot be executed. Such a situation in which the prescan cannot be executed, often occurs in the first page of the original document to be transmitted.

Therefore, if such a situation occurs, the binarization slice level is determined on the basis of the prescan data which was derived with regard to the last page in the preceding transmission of the image.

However, when the preceding image transmission was performed for a long period of time, the final prescan executed for this image transmission provides the all-white data when the fluorescent lamp (light source) is sufficiently warmed.

Moreover, when the time interval between the preceding image transmission and the subsequent image transmission is long, the fluorescent lamp is completely cooled.

Accordingly, if such a situation occurs in which the prescan cannot be performed when the fluorescent lamp is fully cooled, even if the slice level is determined using the data of the preceding prescan as reference data, the binarization cannot be properly performed.

In such a conventional image readout apparatus, since the light amount and light amount distribution of the light source (e.g., fluorescent lamp) largely change in dependence on the temperature of the pipe wall, there is a drawback such that the proper slice level cannot be set when the prescan cannot be performed.

SUMMARY OF THE INVENTION

The present invention is made in consideration of the foregoing points and it is an object of the invention to provide an image readout apparatus which can execute shading correction on the image readout signal in a desirable manner.

Another object of the invention is to provide an image readout apparatus which can efficiently obtain a reference signal which is used when the image readout signal is subjected to the shading correction.

Still another object of the invention is to provide an image readout apparatus which can perform the shading correction in accordance with the operating state of the image readout apparatus.

Still another object of the invention is to provide an image readout apparatus suitable for the transmitting section of a facsimile apparatus.

The above and other objects, operations, and advantages of the present invention will become apparent from the following detailed description and the appended claims with reference to the accompanying drawings.

DETAILED DESCRIPTION OF THE PREFERRED EMBODIMENTS

Shading Correction

The necessity of the shading correction will be first described. An image readout apparatus using a one-dimensional sensor such as a CCD line sensor uses a rod-shaped light source such as, e.g., a fluorescent lamp or the like as a light source. When the fluorescent lamp is used, a difference is caused between the light amount at the center of the lamp and the light amounts at both ends of the lamp. When a lens is used, the peripheral light amount deteriorates due to the rule of $\cos^4\theta$ or the like. Thus, the output of the sensor does not become uniform and this state is called a shading distortion. To correct the shading distortion, the mechanical shading correction and the electrical shading correction are considered. According to the mechanical shading correction, for example, the peripheral light amount is increased and transmitted by use of a slit, thereby decreasing the light amount in the central portion. According to the electrical shading correction, for example, when a video signal is binarized, a reference voltage is applied in accordance with the light amount distribution of the fluorescent lamp or the like.

Figure 1:
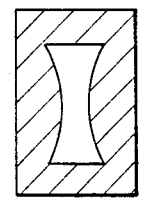
FIG. 1 shows a shading plate which is used when the shading is mechanically performed.

First, in the case of the mechanical shading correction, a shading plate to restrict the transmission of the reflected light amount from an object as shown in FIG. 1 is provided between the fluorescent lamp and the object or between the object and the lens, thereby increasing the transmission light amount in the central portion than the peripheral light amount. In this manner, the imbalance of the light amounts output by the fluorescent lamp or lens is corrected.

Figure 2A:
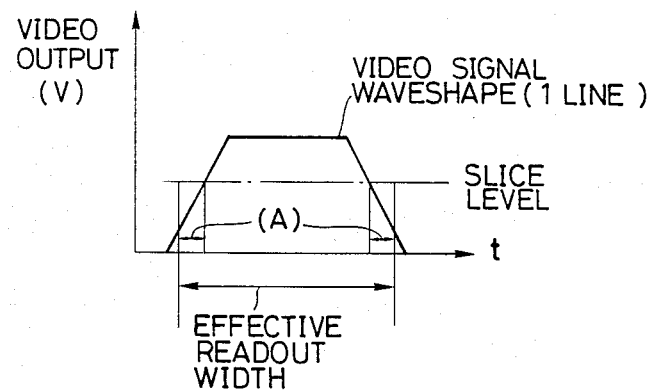
FIG. 2A is a diagram showing a waveshape of a video signal of one line (waveshape after the DC restoration was performed) and a slice level when the electrical shading is not performed.
Figure 2B:
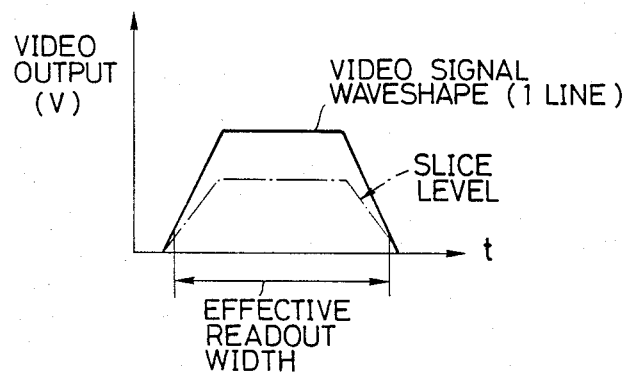
FIG. 2B is a diagram showing a waveshape of a video signal of one line (waveshape after the DC restoration was performed) and a slice level when the electrical shading was performed.

The electrical shading correction will now be explained. FIG. 2A shows a waveshape of a video signal of one line corresponding to a white image (waveshape after the DC restoration was performed) and a slice level when the electrical shading correction is not performed. For example, the slice level of about sixty percent of the peak voltage of the video signal waveshape is considered. It is assumed that the effective readout width is equal to the length shown in the diagram. In this case, the interval shown at (A) is chosen to be the black signal interval although it is actually the white signal interval. Therefore, it is used to execute the electrical shading correction. First, before an image reaches the readout position, the all-white image is read out and the waveshape of the video signal at this time is stored into a memory. The waveshape stored in the memory is reproduced on the basis of the level of about sixty percent of the peak voltage of the present video signal waveshape and set into the slice level. Due to this, the image signal can be binarized in consideration of the shading characteristic of the video signal waveshape. FIG. 2B shows a waveshape of a video signal of one line corresponding to the white image (waveshape after the DC restoration was performed) and a slice level when the electrical shading correction was executed.

Figure 3A:
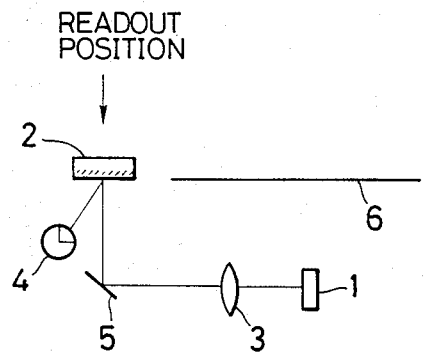
FIG. 3A is an explanatory diagram when an original document is set before the readout position.
Figure 3B:
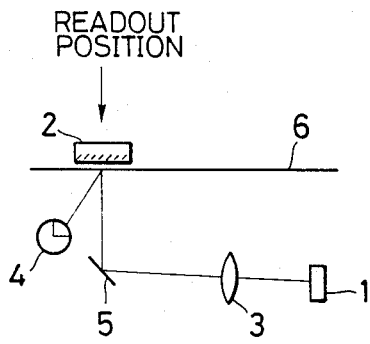
FIG. 3B is an explanatory diagram when an original document is inserted beyond the readout position.

The electrical shading correction will be practically explained with reference to FIGS. 3A and 3B. When an original document 6 is set before the readout position of an image sensor 1, the all-white signal of a reference white plate 2 is read before the original document 6 reaches the readout position (hereinafter, this scanning operation is called a prescan). The video signal waveshape which is output from the image sensor 1 based on the present light amount distribution is stored. For example, it is stored into a memory (RAM) whose power source is backed up by a battery. The slice level is determined using the stored video signal waveshape as a reference. FIG. 3A shows a diagram when the original document 6 is set before the readout position. In FIG. 3A, the reference white plate 2 is used when the prescan is performed. The surface on the side of the hatched portion of the reference white plate is colored white. Numeral 3 denotes a lens; 4 is a fluorescent lamp; 5 a mirror; and 6 the original document. When a plurality of original documents are set, the prescan is again performed after each original document was read.

On the other hand, when the original document 6 is inserted beyond the readout position of the image sensor 1, the prescan cannot be performed, so that the all-white video signal cannot be read. Therefore, when the all-white video signal is stored in the memory backed up by a battery, the slice level is decided using the video signal waveshape as a reference. On the other hand, when the all-white video signal waveshape is not stored in the memory, the electrical shading correction is not performed but only the mechanical shading correction is executed. FIG. 3B is a diagram depicting when the original document 6 is inserted beyond the readout position.

Readout Section

Figure 4:
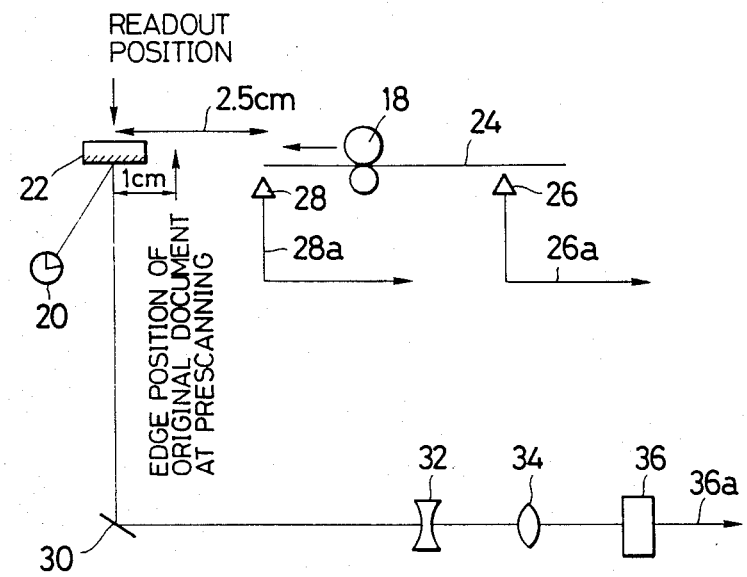
FIG. 4 is a diagrammatical view showing a readout section of a facsimile apparatus of the first embodiment of the present invention.

The first embodiment of the invention will now be described in detail hereinbelow. FIG. 4 shows a diagrammatical view of the readout section of a facsimile apparatus.

In FIG. 4, numeral 20 denotes a fluorescent lamp for illuminating the original document and may comprise e.g., a rod-shaped fluorescent lamp.

A reference white plate 22 is used when performing the prescan. The length of the white plate 22 is wider than the readout scan width of a line image sensor 36 and the surface on the side of the hatched portion is uniformly colored in white.

An original document 24 is fed by an original document feed roller 18.

A sensor 26 (document sensor; this sensor is called a DS) detects whether the original document has been set or not. When no original document is set on the DS 26, a signal of the signal level "0" is output to a signal line 26a. When an original document is set on the DS 26, a signal of the signal level "1" is output to the signal line 26a.

A sensor 28 (document edge sensor; this sensor is called a DES) detects the edge of the original document. When no original document is set on the DES 28, a signal of the signal level "0" is output to a signal line 28a. When an original document is set on the DES 28, a signal of the signal level "1" is output to the signal line 28a.

In general, it is detected by the DS 26 whether an original document has been set onto the original document base or not. The original document is fed by the roller 18 until the edge of the original document is detected by the DES 28. Then, the prescan is executed. In this case, since the distance from the DES 28 to the readout position is already known, the original document is subsequently again fed by the length as long as this distance by a roller 18. The readout operation is started.

On the other hand, when an original document has already been set to the positions to be detected by the DS 26 and DES 28, it is unknown to which position the original document is inserted. In such a case, it is determined that the original document has been set to the readout position and the prescan cannot be performed.

In FIG. 4, numeral 30 denotes a reflecting mirror and 32 is a shading plate to mechanically correct variations in light amount distributions of the fluorescent lamp 20 and a lens 34. A CCD is used as the line image sensor 36 in this embodiment. An output of the CCD 36 is output to a signal line 36a.

Figure 5:
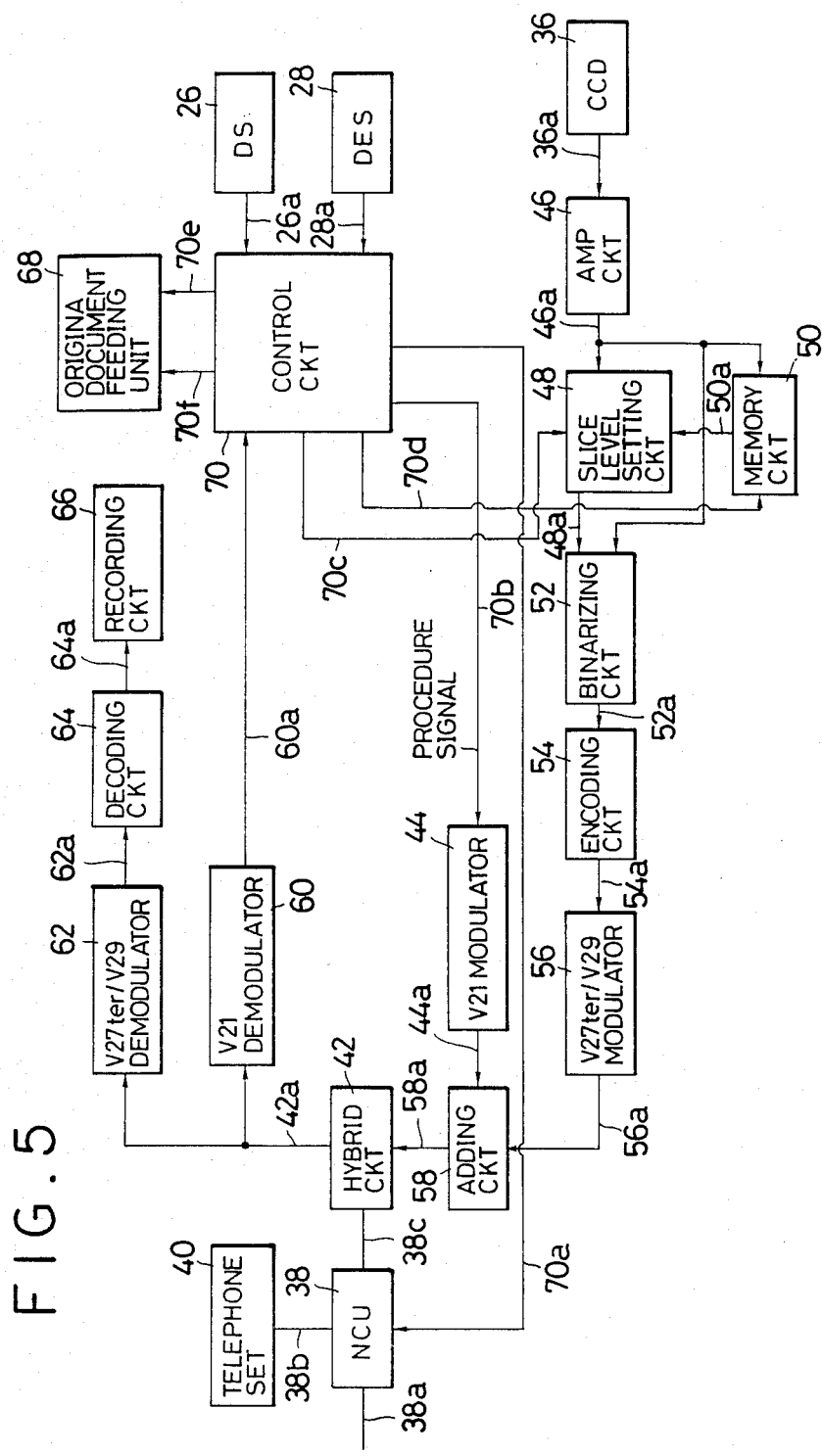
FIG. 5 is a control block diagram of the facsimile apparatus shown in FIG. 4.

FIG. 5 shows a control circuit block diagram. In FIG. 5, the DS 26, DES 28, and image sensor 36 are the same as those shown in FIG. 4. To use a telephone network for data communication or the like, a network control unit (NCU) 38 is connected to a terminal of the line, thereby controlling the connection of the telephone network, switching to the data communication path, and holding the loop. A signal line 38a is a telephone line. The NCU 38 receives a signal on a signal line 70a from a control circuit 70. When the level of this signal is "0", the telephone line 38a is connected to a signal line 38b on the side of a telephone set 40. When the signal level of the signal line 70a is "1", the telephone line 38a is connected to a signal line 38c on the side of the facsimile apparatus. In the ordinary state, the telephone line is connected to the side of the telephone set 40.

A hybrid circuit 42 is provided to separate the signal on the transmission system from the signal on the reception system. Namely, the transmission signal of a signal line 58a passes from the hybrid circuit 42 through the signal line 38c and is transmitted through the NCU 38 to the telephone line 38a. The signal sent from the distant side is transmitted through the NCU 38 and passes through the signal line 38c. Then, this signal is output from the hybrid circuit 42 to a signal line 42a.

A modulator 44 performs modulation on the basis of the well-known CCITT recommendation V21. The modulator 44 receives a procedure signal of a signal line 70b from the control circuit 70 and modulates it and outputs the modulation data to a signal line 44a.

An amplifier circuit 46 obtains the gain of the output of the CCD 36 which was output to the signal line 36a. Thereafter, a sampling and holding process and DC restoration are performed and the resultant waveshape is output to a signal line 46a.

A slice level setting circuit 48 determines the slice level on the basis of the waveshape of the amplified output of the CCD 36 which was output from the amplifier circuit 46 to the signal line 46a. When the signal of the level "0" is output from the control circuit 70 to a signal line 70c, the shading correction is not performed. Therefore, for example, the peak value in a predetermined interval of the signal line 46a is detected and a signal having the level of sixty percent thereof is output to a signal line 48a. When the signal of the level "1" is output to the signal line 70c, the shading correction is executed. Therefore, for example, the peak value in the predetermined interval of the signal line 46a is detected. The data of the all-white waveshape of a signal line 50a from a memory circuit 50 is input. A similar waveshape of the all-white waveshape stored in the memory circuit 50 at prescanning (in this case, the peak value varies since the peak value of the image which is being read out at present is considered) is formed. The signal of the level of sixty percent of that waveshape is output to the signal line 48a.

When a prescan command pulse is generated from the control circuit 70 to a signal line 70d, the all-white waveshape output to the signal line 46a is input to the memory circuit 50 and the data of one line is stored therein. The data stored is output to the signal line 50a as mentioned above. The memory circuit 50 operates by a standby power source which always supplies power to the memory circuit 50 irrespective of the on/off status of the main switch of the image readout apparatus.

A binarizing circuit 52 receives the video signal waveshape after completion of the DC restoration which was output from the amplifier circuit 46 to the signal line 46a. The binarizing circuit 52 also receives the slice level which was output from the slice level setting circuit 48 to the signal line 48a. Then, the binarizing circuit 52 performs the binarization. When the signal level of the video signal waveshape of the signal line 46a is higher than the signal level of the slice level of the signal line 48a, namely, in the case of the white signal, the signal of the signal level "1" is output from the binarizing circuit 52 to a signal line 52a. When it is lower than the signal level of the slice level of the signal line 48a, namely, in the case of the black signal, the signal of the signal level "0" is output to the signal line 52a.

An encoding circuit 54 receives the binarized data which was output from the binarizing circuit 52 to the signal line 52a and performs, for example, the MH (Modified Huffman) or MR (Modified Read) coding process. Then, the encoding circuit 54 outputs the encoded data to a signal line 54a.

A modulator 56 performs the modulation on the basis of the well-known CCITT recommendation V27 ter (differential phase modulation) or V29 (quadrature modulation). The modulator 56 receives the signal of the signal line 54a from the encoding circuit 54 and modulates it and outputs the modulated data to a signal line 56a.

An adding circuit 58 receives both the signal of the signal line 44a of the modulator 44 and the signal of the signal line 56a of the modulator 56 and adds them. The adding circuit 58 then outputs the result of the addition to the hybrid circuit 42 through the signal line 58a.

A demodulator 60 performs the demodulation on the basis of the well-known CCITT recommendation V21. The demodulator 60 receives the signal of the signal line 42a from the hybrid circuit 42 and performs the V21 demodulation and outputs the demodulated data to a signal line 60a.

A demodulator 62 performs the demodulation on the basis of the well-known CCITT recommendation V27 ter (differential phase modulation) or V29 (quadrature modulation). The demodulator 62 receives the signal of the signal line 42a from the hybrid circuit 42 and performs the demodulation and outputs the demodulated data to a signal line 62a.

A decoding circuit 64 receives the demodulated data which was output to the signal line 62a from the demodulator 62 and outputs the decoded data (based on the MH or MR) to a signal line 64a.

A recording circuit 66 receives the decoded data which was output to the signal line 64a from the decoding circuit 64 and sequentially records the white and black signals line by line.

Numeral 68 denotes an original document feeding unit. When a feed command pulse is generated from the control circuit 70 to a signal line 70f, if the signal of a signal line 70e from the control circuit 70 has a signal level of "0", the original document unit 68 feeds the original document by 1/7.7 mm. Likewise, if the signal level is "1", the original document is fed by 1/6.16 mm. If it is "2", the original document is fed by 1/3.85 mm. If it is "3", the original document is fed by 1/3.08 mm. The feeding unit 68 drives the original document feed roller 18 shown in FIG. 4.

When the image readout mode is selected, namely, when the transmission mode is selected, the control circuit 70 soon starts feeding the original document until a predetermined position is reached (the position to perform the prescan; the position which is 1 cm before the readout position). Thereafter, if the communication link is not constructed and the communication is not performed, the prescan is executed and the original document is fed to the readout position. The control circuit 70 also performs the other various kinds of controls. The control circuit 70 operates by the standby power source and comprises a ROM, a RAM, a CPU, and the like.

Figure 6A:
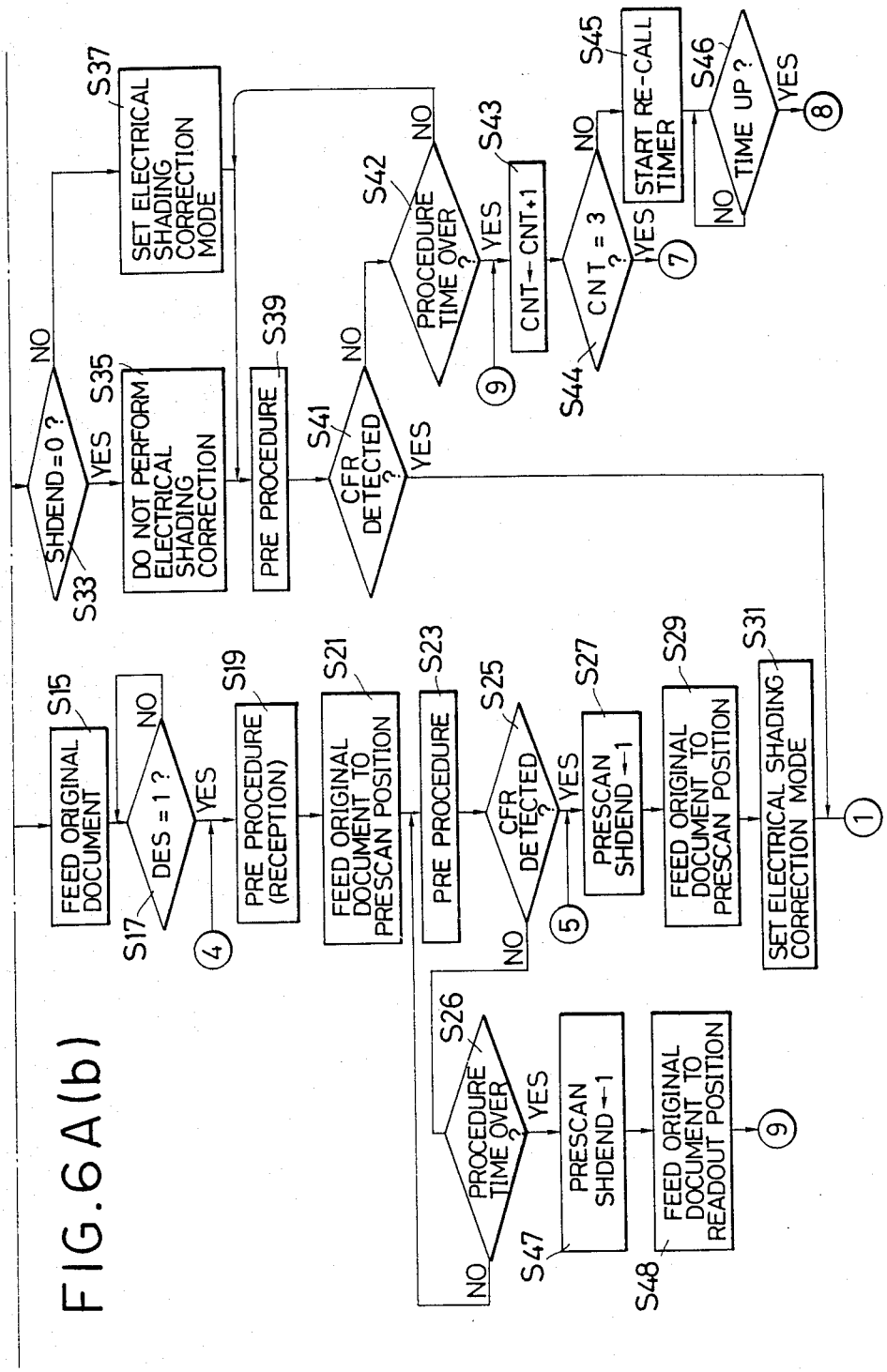
FIGS. 6A and 6B are control flowcharts of a control circuit 70 in FIG. 5.
Figure 6B:
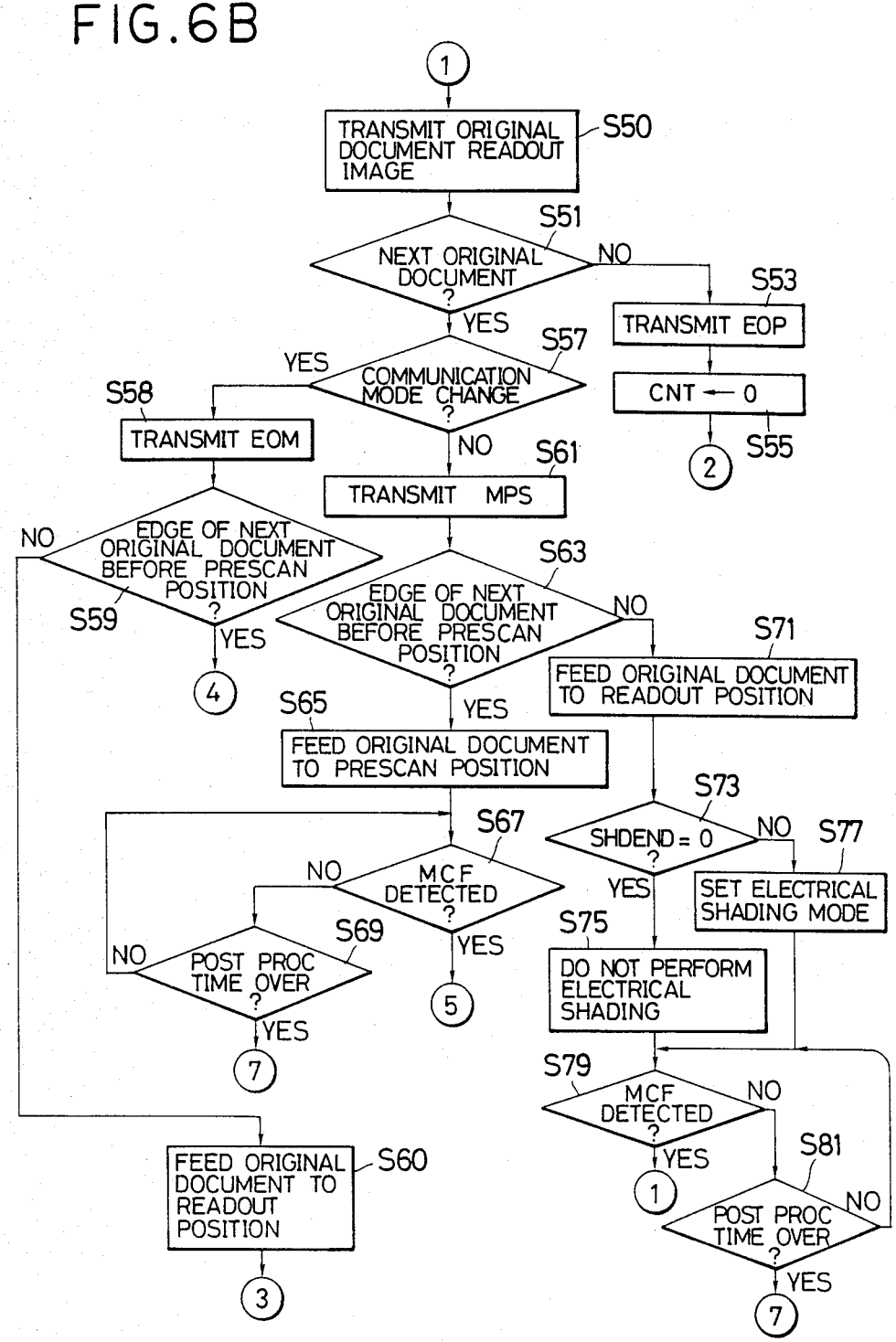

FIGS. 6A and 6B show flowcharts for the original document readout control of the control circuit 70 shown in FIG. 5.

When the main power source and the standby power source are turned on from the off state, a flag SHDEND indicative of the end of the shading is set to "0" in step S1 because no data to perform the shading correction is stored in the memory circuit 50. On the other hand, the value of a counter CNT indicative of the number of re-call times when the communication link is not constructed is set to "0" in step S1. The maximum number of re-call times is two.

In the next step S3, the processing mode is detected. In the case of the transmission mode, the processes in step S7 and subsequent steps are executed. In the case of the reception mode, copy mode, or the like, step S5 follows and the other processes are executed. In this example, only the transmitting processes will be explained.

First, in step S7, the reception side dial number designated by the dial key, one-touch key, abbreviation key, or the like is registered into a predetermined area in the RAM of the control circuit 70. The dial number is called in step S9.

After calling, a check is made in step S10 to see if the original document sensor DS 26 has detected the original document or not. If the original document was removed after completion of the calling, the error processes in steps S11 and S12 are executed. The registered number and the count value of the re-call counter CNT are reset and the processing routine is returned to the initial state.

If the DS 26 has detected the original document, a check is made in step S13 to see if the original document edge sensor DES 28 has detected the original document edge or not. If the answer is NO, the processes in step S15 and subsequent steps are executed. On the contrary, if the DES 28 has detected the original document, it is impossible to know to which position, from the detection position of the DES 28, the original document edge was inserted; therefore, the other processes in step S33 and ubsequent steps are executed.

The case where the original document does not exist at the detection position of the DES 28 will be first explained. In step S15, the original document feeding unit 68 is made operative to start feeding the original document by the roller 18. Thereafter, when the DES 28 detects the original document edge, pre-procedure signals (NSF, CSI, DIS) from the reception side are received (step S19) and the original document is further fed to a predetermined position (prescan position) before the readout position of the CCD 36 (step S21). When the original document has reached the prescan position, pre-procedure signals (NSS, TSI, DCS) on the transmission side are promptly transmitted in the case where the pre-procedure signals have already been received from the reception side. In this case, if the reception of the pre-procedure signals from the reception side is not yet completed, the reception of those signals is continued, and after all of them are received, the pre-procedure signals NSS, TSI, and DCS are transmitted (step S23).

Thereafter, if a CFR signal indicative of the completion of the preparation of the image reception from the reception side is detected in step S25, the prescan (to read the reference white plate 22 by the CCD 36) is performed in step S27. After completion of the readout of the reference white plate 22, a flag SHDEND indicative of the existence of the shading data is set to "1". In step S29, the original document is again fed to the readout position by the roller 18. In step S31, the apparatus is set into a mode on execute the electrical shading correction to the readout data of the original document from the CCD 36 by the shading data obtained by the prescan before the original document is read out. Thereafter, the processes in FIG. 6B are executed as will be explained hereinafter.

On the other hand, if the procedure timer has timed out for the interval until the CFR signal is detected in step S26, namely, even when the communication link is not constructed, the prescan is also performed in step S47, thereby enabling the shading data obtained in step S47 to be used in the case where the communication link is constructed by re-calling. In step S47, the flag SHDEND is set to "1" after the prescan. In step S48, the roller 18 is driven to feed the original document so that its edge reaches the readout position. This is because when the communication link was constructed by re-calling, the original document edge is preliminarily fed to the readout position, thereby preventing the additional image data from being transferred. After completion of the process in step S48, step S43 follows and the count value of the re-call counter CNT is increased by "1". In step S44, if the count value of the re-call counter CNT is 3, namely, if it is detected that the communication link is not constructed by the first call and by the second re-call, the error processes in steps S11 and S12 are executed and the foregoing operation is executed.

If the count value CNT of the re-call counter has not yet reached 3, the re-call timer is started in step S45. If the re-call timer has timed out, the re-call is executed in step S9. In general, the counting time of the re-call timer is set to about three minutes.

As described above, even when the construction of the communication link for the image transmission was not detected, the prescan is previously executed in order to cope with the case where the re-call is executed and the original document edge is fed to the readout position.

The case where the original document edge was detected by the DES 28 in step S13 will now be explained.

Such a situation occurs in the case where the communication link was not constructed by the preceding call or where after the original document was inserted, the power source is disconnected and the power source is then turned on again, or the like.

In step S33, a check is made to see if the flag SHDEND has been set to "1" or not. If it is "0", the shading data is not stored in the memory circuit 50; therefore, only the mechanical shading correction is executed (step S35). On the contrary, if the flag SHDEND is set to "1", the electrical shading correction is executed when the original document is read out (step S37).

In step S39, the communication pre-procedure is executed. When the CFR signal is detected, the image transmitting procedure in FIG. 6B is executed. On the other hand, if the procedure timer (ordinarily, about 35 seconds) has timed over before the CFR signal is detected, step S43 follows and the count value of the re-call counter CNT is increased by "1". The subsequent operations in steps S44 to S46 are executed as mentioned above.

The processes in step S50 and subsequent steps in FIG. 6B will now be described.

In step S50, the original document is fed by the roller 18, the original document is read by the CCD 36, and the readout image data is transmitted. In this case, if the shading data has been stored in the memory circuit 50 and the electrical shading correction has been set in step S31 or S37, the electrical shading correction and the mechanical shading correction are executed. On the other hand, if the flag SHDEND is set to "0", only the mechanical shading correction is performed. When the flag SHDEND is set to "0", the electrical shading correction may be also carried out by using predetermined shading data instead of the data derived by reading the reference white plate.

After completion of the image transmission of the original document, a check is made in step S51 to see if the next original document has been detected by the sensor DS 26 or not. If the answer is NO, an EOP code is transmitted, the re-call counter CNT is reset to "0", and the processing routine is returned to the initial state (steps S53 and S55).

On the other hand, if the next original document is detected, a check is made in step S57 to see if the communication mode has been changed or not. In step S58, an EOM code is transmitted when the communication mode is changed. In step S59, a check is made to see if the edge of the next original document is located before the prescan position or not (on the basis of the movement amount from the edge detection position of the next original document by the sensor DES 28). If it is before the prescan position, the processing routine is returned to step S19 and the pre-procedure is executed again. The image data of the next original document is transmitted in the changed communication mode. In this case, the prescan is again carried out. If the original document edge has reached the downstream side from the prescan position, the original document edge is fed by the roller 18 until the readout position in step S60 is reached. Step S33 then follows. In this case, although the communication mode is updated, the shading data in the memory circuit 50 is not updated.

If the communication mode is not changed in step S57, an MPS signal is then transmitted in step S61.

In step S63, a check is made to see if the next original document edge is located before the prescan position or not. If the edge has reached the upstream side from the prescan position, the original document edge is fed to the prescan position (step S65). A check is made in step S67 to see if an MCF signal indicative of the normal reception of the preceding original document has been received from the reception side or not. If YES, step S27 follows. The prescan is then performed and the original document is further read. In this case, the communication mode is not changed but only the shading data is updated. If the MCF signal is not detected within a predetermined period of time, the error processes in steps S11 and S12 are executed.

If it is detected in step S63 that the original document edge has reached the downstream side from the prescan position, the original document is fed to the readout position in step S71. In step S73, a check is made to see if the flag SHDEND is set to "1" or not. If YES, upon the readout operation, the electrical shading correction is executed using the preceding shading data after the MCF signal was received (steps S77 and S79). On the contrary, if the flag SHDEND is set to "0", only the mechanical shading correction is performed (step S75). If the MCF signal is not detected within the predetermined time, the error processes are carried out.

As described above, according to the embodiment, the electrical shading correction can be performed irrespective of the original document edge position when the communication link was constructed. A readout image signal of a high quality can be always obtained. On the other hand, when the communication link is not constructed, the original document edge is sent to the readout position. Therefore, when the communication link was constructed by re-calling, the time to feed the original document is unnecessary and there is no need to transmit the additional image data for the period of time corresponding to the interval between the original document edge and the readout position. In particular, the invention is effective upon re-calling.

In the embodiment, the prescan is performed after the CFR signal was detected. However, the prescan may be also executed before the CFR signal is detected.

As described above, even when the communication link for the image transmission is not constructed, the shading data for the electrical shading correction is read out. Therefore, when the communication link was later constructed, the electrical shading correction can be carried out irrespective of the position of the edge of the original document image. Therefore, readout image data of high quality is always derived.

According to the foregoing constitution of the first embodiment of the invention, the readout of the reference plate for the shading correction can be executed before the readout of the original document is started. A image signal of good quality can be obtained.

Although the invention has been described using a transmitting of the facsimile apparatus in the foregoing embodiment, the invention is not limited to this. The invention can be also applied to image readout apparatus which is used in a digital copying apparatus, etc., or an electronic filing apparatus.

In the embodiment, in spite of the fact that a readout command was input in the facsimile apparatus, if the reception side cannot receive the image data, the prescan is preliminarily executed. However, for example, in the digital copying apparatus or the like, the invention can be also constituted in a manner such that the prescan is previously executed in the readout section in the case where no recording medium is set in the printer or where the printer is in the inoperative mode because of the jam of recording media or the like.

Figure 7:
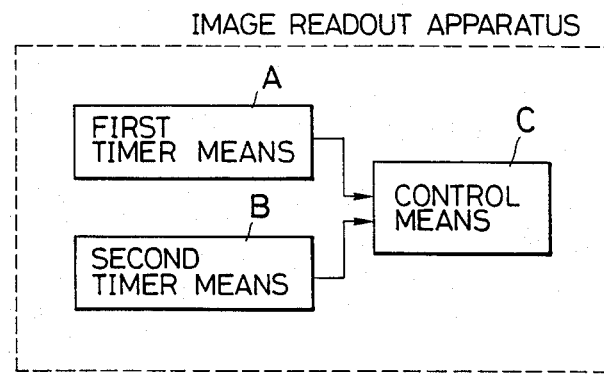
FIG. 7 is a constitutional diagram showing a whole image readout apparatus according to the second embodiment of the invention.

FIG. 7 is an overall constitutional diagram of the second embodiment of an image readout apparatus according to the invention. This apparatus also performs the prescanning process prior to the readout of the original document image similarly to the foregoing first embodiment. The image readout apparatus further comprises: first timer means A for transmitting a first output when the readout operating time of the original document to be transmitted has elapsed a predetermined time; second timer means B for transmitting a second output when a predetermined rest period of time has elapsed after completion of the readout of the original document; and control means C for detecting the generation of the first and second outputs and performing the prescanning process under the condition such that the original document is not set to the readout position.

Figure 8:
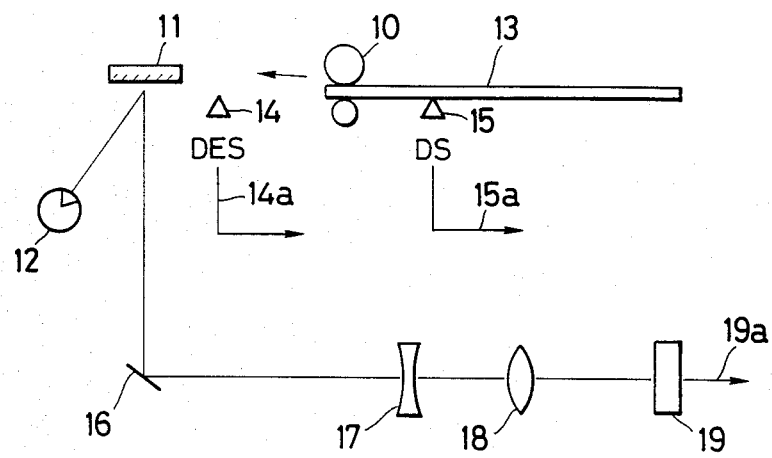
FIGS. 8 and 9 are diagrams showing a detailed constitution of the image readout apparatus in FIG. 7.

FIG. 8 is a schematic constitutional diagram showing an embodiment of the image readout apparatus. In the diagram, reference numeral 10 denotes a feed roller to feed the original document in the direction indicated by an arrow. Numeral 11 is a reference white plate which is used to perform the prescan. The surface on the side of the hatched portion of the white plate 11 is colored white.

Numeral 12 denotes a fluorescent lamp and 13 is an original document.

Numeral 14 denotes a document edge sensor DES to detect the edge of the original document. When no original document is set on the DES 14, a signal of the signal level "0" is output to a signal line 14a. When an original document is set on the DES 14, a signal of the level "1" is output to the signal line 14a.

A document sensor DS 15 detects whether an original document has been set or not. When no original document is set on the DS 15, the signal of the signal level "0" is output to a signal line 15a. When an original document is set on the DS 15, the signal of the level "1" is output to the signal line 15a. In general, it is detected by the DS 15 whether an original document has been set on the original base or not. When the original document is set, the original document is fed by the roller 10 to the position to be detected by the DES 14 and the prescan is performed. In this case, since the distance from the DES 14 to the readout position has already been known, the original document is fed by the roller 10 by only this distance. Then, the readout operation by a CCD 19 is started.

On the other hand, when both of the DS 15 and the DES 14 are covered by the original document, it is unknown to which position the original document was inserted. Therefore, it is determined that the prescan cannot be executed.

Numeral 16 denotes a reflection mirror.

Numeral 17 is a shading plate such as shown in FIG. 1 for optically correcting the fluctuations in light amount distribution of the fluorescent lamp and lens.

Numeral 18 denotes a lens.

In this embodiment, a CCD is used as the image sensor 19. The output signal of the CCD is output to a signal line 19a.

Figure 9B:
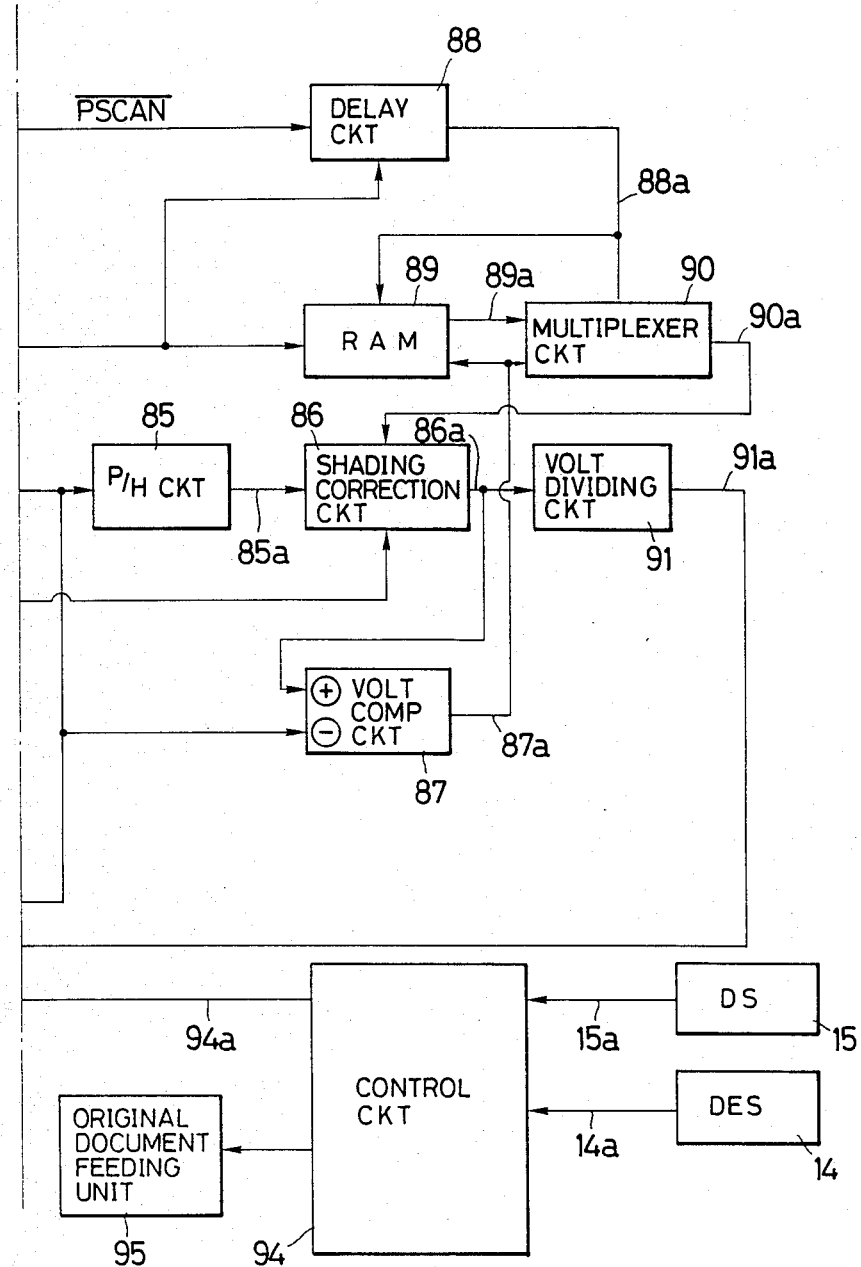

FIG. 9 is a block diagram showing an electrical control circuit of the embodiment shown in FIG. 8. The DES 14, DS 15, and CCD 19 shown in this diagram are the same as those shown in FIG. 8, respectively.

A timing circuit 80 generates various kinds of timing pulses. The timing circuit 80 outputs to a signal line 80a, transfer pulses $\phi_1$ and $\phi_2$, a shift pulse SH, a reset pulse RS, a sampling pulse $\phi_s$, a DC restoration signal $V_{REF}$ which is made active when a dark output is generated, and address data to designate an address in the RAM.

A drive circuit 81 converts a pulse formed by the level of $C^2MOS$ or TTL into a CCD driving level and supplies a pulse to the CCD (image sensor) 19.

An amplifier circuit 82 amplifies the output signal 19a of the CCD 19. The amplified CCD output signal is output to a signal line 82a.

Numeral 83 denotes a sample and hold curcuit. Since the signals (e.g., reset signal and dark output signal) other than the image signal (photo signal) are included in the signal which was output to the signal line 82a from the amplifier circuit 82. Therefore, the sample and hold (S/H) circuit 83 samples the data at a timing when the image signal (photo signal) is output and holds the sample data. Accordingly, only the analog image signal component is output to a signal line 83a.

A DC restoration circuit 84 corrects the DC component of the signal which was output to the signal line 83a from the S/H circuit 83, thereby adjusting the dark output level to the ground level. The DC restoration signal is output to a signal line 84a.

A peak hold circuit 85 holds the peak value of the signal which was output to the signal line 84a from the DC restoration circuit 84. The signal whose peak value was held is output to a signal line 85a.

A shading correction circuit 86 has the charging and discharging functions, which will be explained in detail hereinafter, and outputs to a signal line 86a a signal waveshape similar to the white signal waveshape on the basis of the data indicative of the white signal waveshape stored in a RAM 89 by the prescan. However, the peak value of the output signal varies in accordance with an output signal 85a of the peak hold (P/H) circuit 85.

A voltage comparing circuit 87 receives the signal which was output to the signal line 84a from the DC restoration circuit 84 and the signal which was output to the signal line 86a from the shading correction circuit 86. When the level of the signal output to the signal line 84a is higher than the level of the signal output to the signal line 86a, the voltage comparing circuit 87 outputs the signal of the signal level "0" to a signal line 87a. At prescanning, when level the signal of the level "0" is output to a signal line 90a through a multiplexer circuit 90, the shading correction circuit 85 performs the charging operation. In addition, the RAM 89 also stores the data "0". At the head of the line, the signal 84a of the ground level is output in response to the signal $V_{REF}$ which is sent from the timing circuit 80. Therefore, at the head of the line, the signal of the ground level is output to the signal line 86a. On the contrary, when the signal of the signal level "1" is output to the signal line 87a from the voltage comparing circuit 87, the shading correction circuit 86 performs the discharging operation and the RAM 89 stores the data "1". The output of the shading correction circuit 86 increases or decreases in accordance with the output of the DC restoration circuit 84 due to the charging or discharging operation. The data corresponding to the increasing or decreasing operation is stored in the RAM 89.

Reference numeral 88 denotes a delay circuit, which will be explained hereinafter, and numeral 89 indicates the random access memory RAM. The RAM 89 is set into the reading mode when the signal level of a signal line 88a from the delay circuit 88 is "0" is set into the writing mode when it is "1".

The multiplexer circuit 90 receives the signal of the signal line 88a from the delay circuit 88. When this signal level is "0", the multiplexer circuit 90 outputs the signal of a signal line 89a from the RAM 89 in the reading mode to the signal line 90a. On the contrary, when the signal level of the signal line 88a is "1", the signal of the signal line 87a from the voltage comparing circuit 87 is output to the signal line 90a. Thus, when the signal level of the signal line 88a is "1", the RAM 89 whose power source is backed up by a battery stores the data to reproduce the all-white video signal. On the other hand, when the signal level is "0", the data stored in the RAM 89 is supplied to the shading correction circuit 86. The shading correction circuit 86 performs the charging or discharging operation on the basis of the data from the RAM 89, thereby outputting a signal waveshape similar to the shading waveshape to the signal line 86a.

A voltage dividing circuit 91 outputs to a signal line 91a the signal having a signal level of about sixty percent of the level of the signal which was output to the signal line 86a from the shading correction circuit 86, thereby deciding the slice level.

A voltage comparing circuit 92 receives the video signal after the DC restoration which was output to the signal line 84a from the DC restoration circuit 84 when the original document image is read and the slice level after the electrical shading correction which was output to the signal line 91a from the voltage dividing circuit 91. Then, the voltage comparing circuit 92 performs the binarization. Namely, when the signal level of the signal line 84a is higher than the signal level of the signal line 91a (i.e., in the case of the white signal), a signal of the signal level "0" is output to a signal line 92a. On the other hand, when the signal level of the signal line 84a is lower than the signal level of the signal line 91a (i.e., in the case of the black signal), a signal of the signal level "1" is output to the signal line 92a.

A signal processing circuit 93 receives the binarized signal which was output to the signal line 92a from the voltage comparing circuit 92 and performs various kinds of signal processes such as transmission, storage, and the like on the image signal.

Numeral 94 denotes a control circuit. When a readout rest interval above a predetermined time (b) has elapsed after the readout operation was performed for a period of time above a predetermined time (a), the control circuit 94 performs various kinds of controls including the function to automatically execute the prescan operation under such a condition that the original document does not yet reached the readout position. Numeral 95 denotes an original document feeding unit to drive the original document feed roller.

Next, the procedure to perform the prescan operation and to store the video signal derived by reading the reference white plate in the RAM 89 will now be described. The data which is stored into the RAM 89 must be such data that the video signal indicative of all-white can be reproduced. For example, in the case of the original document of the A3 size, in order to read the image at the density of 8 pixels/mm, it is necessary to use a CCD consisting of 2592 pixels to obtain the video signal. When it is assumed that data of eight bits is stored for each pixel, 256 kinds of levels can be set for each pixel. However, in this embodiment, the charge and discharge of certain time constants are repeated (the differential data is supplied) on the basis of the peak voltage of the video signal, thereby reproducing the video signal indicative of all-white. Therefore, in this case, it is sufficient to use a RAM of $2592 \times 1$ bits.

In the case of storing the all-white video signal, the control circuit 94 first generates a prescan start pulse $\overline{PSCAN}$ on a signal line 94a. Then, the delay circuit 88 outputs a signal of the level "1" the signal line 88a. Further, when two shift pulses SH are sent to the signal line 80a, the delay circuit 88 outputs a signal of the level "0" to the signal line 88a. When the level of the signal output to the signal line 88a is "0", the data to reproduce the all-white video signal is output from the RAM 89 in the reading mode. On the other hand, when the signal level of the signal line 88a is "1", the data to reproduce the all-white video signal is input to the RAM 89 in the writing mode. Namely, the data (output to the signal line 87a) for the interval after the foregoing prescan start pulse $\overline{PSCAN}$ was sent and the shift pulse SH was further generated until the next shift pulse SH is generated, is input to the RAM 89.

Figure 10:
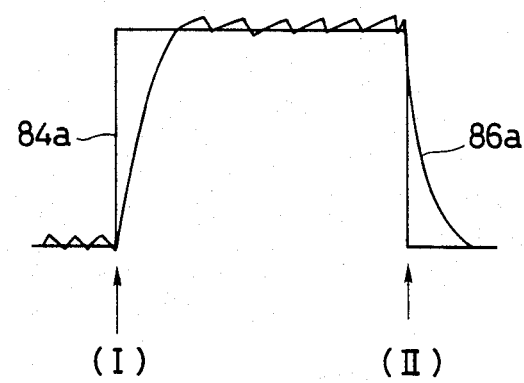
FIG. 10 is a waveshape diagram showing the relation between a DC restoration signal at prescanning and a signal which is stored into a RAM.

FIG. 10 is a diagram showing a DC restoration waveshape at prescanning and a waveshape which is stored in the RAM 89. In the diagram, at point (I), the signal output to the signal line 84a from the DC restoration circuit 84 is larger than the signal output to the signal line 86a from the shading correction circuit 86, so that the data "0" is stored in the RAM 89 on the basis of the address data. At the same time, since the signal of the level "0" is also output to the signal line 90a, the charging operation is performed in the shading correction circuit 86. On the other hand, at point (II), since the signal output to the signal line 84a is smaller than the signal output to the signal line 86a, the data "1" is stored in the RAM 89. At the same time, since a signal of the level "1" is also output to the signal line 90a, the discharging operation is executed in the shading correction circuit 86. For example, assuming that the number of pixels necessary to read the original document of the A3 size is 2592 dots, "0" (i.e., the charging operation is performed) or "1" (i.e., the discharging operation is performed) needs to be made to correspond to each pixel position and stored in the RAM 89. Therefore, address data corresponding to each pixel is output to the signal line 80a and the data "1" or "0" of one line is stored in the RAM 89 every pixel.

Next, the procedure to read out the data stored in the RAM 89 and to output the waveshape similar to the all-white waveshape stored at prescanning to the signal line 86a will now be explained. However, the peak value of the similar waveshape varies in accordance with the peak value of the image signal which is being read at present.

Since a signal of the level "0" is output to the signal line 88a, the signal on the signal line 89a from the RAM 89 in the reading mode is output to the output signal line 90a of the multiplexer circuit 90. The data "0" or "1" is output in correspondence to each pixel of one line on the basis of the address data. At this time, since the shading correction circuit 86 charges or discharges the capacitor provided therein in response to the signal output to the signal line 90a, a waveshape similar to the all-white waveshape stored at prescanning is output to the signal line 86a (namely, the electrical shading correction can be performed).

Figure 11A:
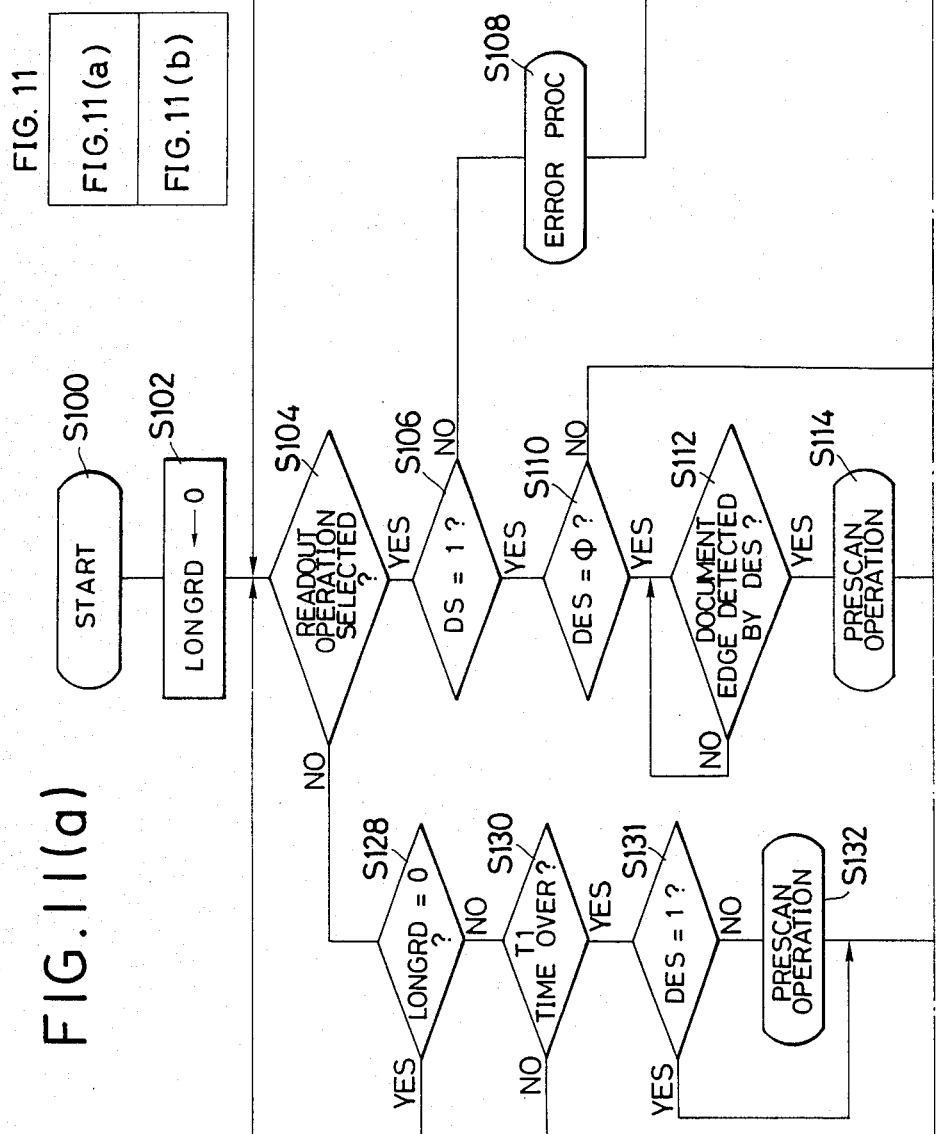
FIG. 11 is a flowchart showing a control procedure which is executed by a control circuit 94 shown in FIG. 9.
Figure 11B:
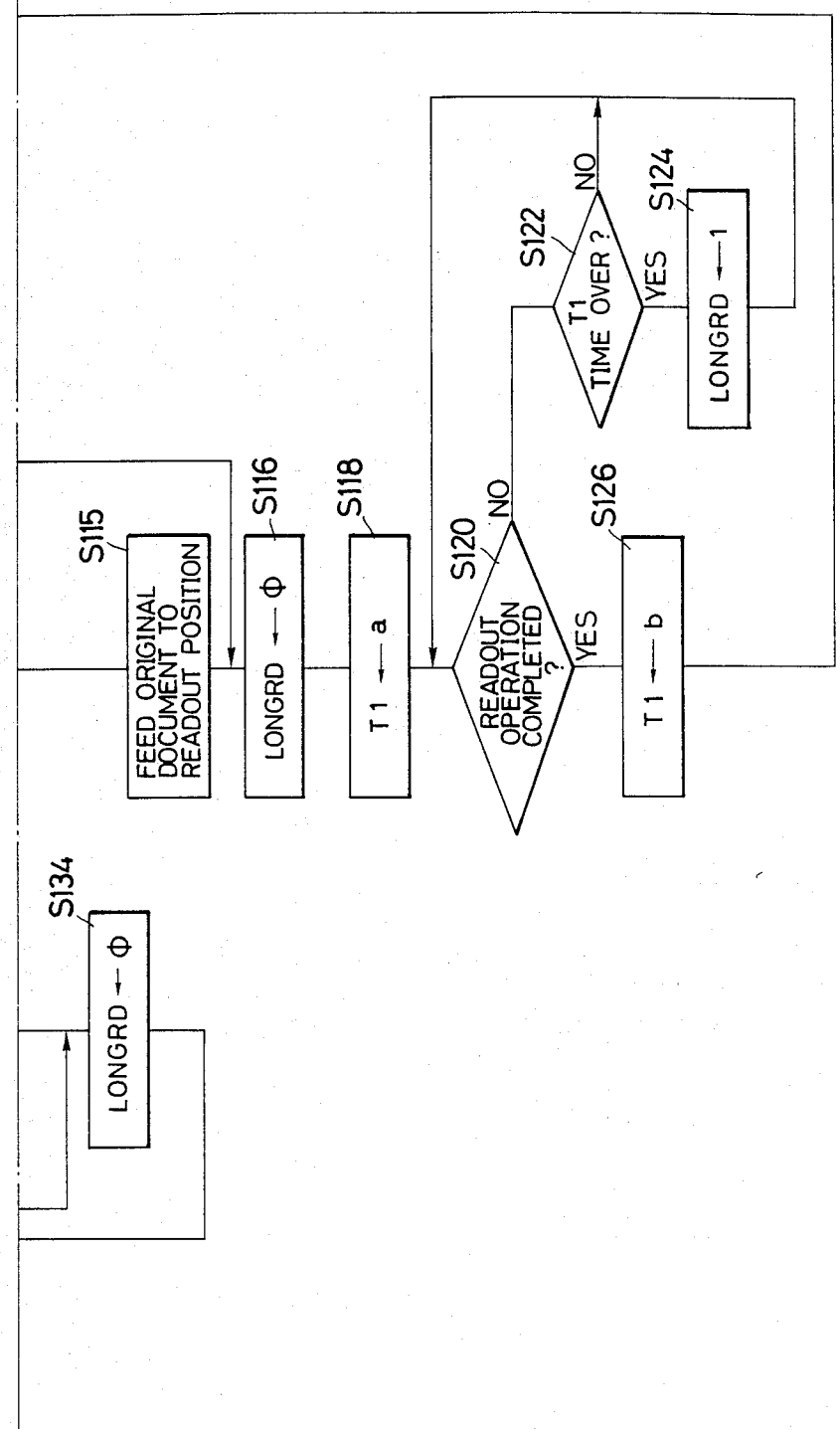

FIG. 11 is a flowchart showing a control procedure to be executed by the control circuit 94.

Step S100 indicates the start of the control.

In step S102, a flag LONGRD indicative of whether the readout operation has been performed for a time above the predetermined time (a) or not is cleared.

In step S104, a check is made to see if the readout operation has been selected by the operation unit or not. If YES, step S106 follows. If NO, step S128 follows.

In step S106, a check is made to see if the original document exists at the detection position of the DS 15 or not. If NO, the error processes are executed (step S108) and step S104 then follows. If the original document exists, step S110 follows.

In step S110, a check is made o see if the original document has been set to the detection position of the DES 14 or not. If YES, the prescan operation is not performed and step S116 follows. If the original document is not detected by the DES 14, step S112 follows.

In step S112, the feed roller 10 is driven until the original document edge is detected by the DES 14. After the edge was detected, step S114 follows.

In step S114, the pulse $\overline{\text{PSCAN}}$ is generated on the signal line 94a to thereby perform the prescan. However, in this case, the fluorescent lamp is preheated for only a predetermined period of time and thereafter the fluorescent lamp is lit. After the elapse of a predetermined time, the prescan is executed to read the reference white plate 11. In step S115, the original document is fed to the readout position by the feed roller 10 and the original document image is read by the image sensor 19.

In step S116, the LONGRD flag is cleared.

In step S118, the value (a) is set to a timer $T_1$ to see if the readout operation has been executed for a time above the predetermined time (a) or not.

In step S120, a check is made to see if the readout operation has been completed or not. When the readout operation is not completed yet, step S122 follows. If the readout operation has been completed, step S126 follows.

In step S122, a check is made to see if the timer $T_1$ has timed out or not. If YES, step S124 follows. If NO, step S120 follows.

In step S124, the flag LONGRD is set to "1" because the readout operation has been performed for a time above the predetermined time (a).

In step S126, the value (b) is set into the timer $T_1$ to see if a time above the predetermined time (b) has elapsed after completion of the readout operation or not.

After the readout operation of the original document is completed as explained above, a check is made in step S104 to see if the readout operation of the next original document has been selected or not. If NO, a check is made in step S128 to see if the flag LONGRD is "0" or not (namely, whether the readout operation previously executed has been performed for a time above the predetermined time (a) or not). When the flag LONGRD is set to "0" (i.e., in the case where the readout operation has been executed for a time below the predetermined time (a)), step S104 follows. On the other hand, when the flag LONGRD is "1" (i.e., when the readout operation has been performed for a time above the predetermined time (a)), step S130 follows.

In step S130, a check is made to see if the timer $T_1$ has timed over or not. If YES, step S131 follows. The processing routine advances to step S131 when the readout operation has been executed for a period of time above the predetermined time (a) and then a period of time above the predetermined time (b) elapsed after completion of the readout operation. If the timer $T_1$ does not yet time out, step S104 follows.

In step S131, a check is made to see if the original document has been set to the readout position or not (namely, whether the output of the DES 14 is "1" or not). If YES (i.e., when a output of the DES 14 is "1"), step S134 follows. On the contrary, when the original document is not set to the readout position (i.e., when the output of the DES 14 is "0"), step S132 follows.

The prescan operation is executed in step S132. This prescan operation is similar to that in step S114.

The flag LONGRD is cleared in step S134.

In the foregoing embodiment, the differential data of one bit is made to correspond to the CCD output of each pixel. However, it is also possible to make the data of n bits ($n \geq 2$) correspond to the CCD output of each pixel and to subsequently D/A convert this data.

As described above, when the readout operation has been performed for a long time and the interval until the next readout operation is executed is long, the prescan is forcedly performed. Therefore, even if the prescan cannot be performed when the original document is read out, the good readout image can be obtained by the proper slice level.

In this embodiment, two time conditions such as the time required for the readout operation and the elapsed time after the end of the readout operation have been considered as the conditions in the case of executing the prescan after completion of the readout operation of the original. However, there is such a case where there is no need to consider these two time conditions. For example, in the high-speed readable apparatus or the apparatus for use in readout of an original document of a small size, since a change in light amount due to the elapse of the readout time is small, only the elapsed time from the end of the readout operation may be considered in such a case. On the other hand, in the apparatus such that the original document is frequently read out, only the time required for the readout operation of the original document may be considered.

Although the present invention has been shown and described with respect to preferred embodiments, various changes and modifications which are obvious to a person skilled in the art to which the invention pertains are deemed to lie within the spirit and scope of the appended claims.

What I claimed is:

1. An image readout apparatus comprising:
   reading means for reading an image and generating electric data representing the image;
   a reference member;
   memory means for storing reference data obtained with reading said reference member by said reading means;
   correcting means for correcting image data obtained by reading an original document by said reading means on the basis of the reference data stored in said memory means; and
   control means for allowing said reference member to be read by said reading means and allowing the reference data to be stored in said memory means even when the original document is not read by said reading means.

2. An apparatus according to claim 1, wherein when an unreadable state of the original document is changed to a readable state, said correcting means corrects the image data on the basis of the reference data already stored in said memory means.

3. An apparatus according to claim 1, wherein said correcting means corrects a digitizing operation for the image data on the basis of the reference data stored in said memory means.

4. An apparatus according to claim 1, further comprising transmission means for transmitting the image data, and wherein when the image data cannot be transmitted, said control means allows said reference member to be read by said reading means and allows the reference data to be stored into the memory means.

5. An apparatus according to claim 1, wherein said reference member is provided at a reading position of said reading means.

6. An apparatus according to claim 5, further comprising feeding means for feeding the original document to the reading position.

7. An apparatus according to claim 1, wherein said correcting means performs a shading correction for the image data.

8. An image readout apparatus comprising:
   reading means for reading an image and generating electric data representing the image;
   a reference member;
   memory means for storing reference data obtained with reading said reference member by said reading means;
   correcting means for correcting image data obtained with reading an original document by said reading means on the basis of the reference data stored in said memory means; and
   control means for allowing said reference member to be read by said reading means and allowing the reference data to be stored in said memory means when a time required to read the original document by said reading means is above a predetermined time.

9. An apparatus according to claim 8, wherein when the original document is not at a reading position of said reading means, said control means causes said reference member to be read by the reading means.

10. An apparatus according to claim 9, further comprising feeding means for feeding the original document to the reading position.

11. An apparatus according to claim 9, wherein said reference member is provided at the reading position.

12. An apparatus according to claim 8, wherein said correcting means corrects a digitizing operation for the image data on the basis of the reference data stored in said memory means.

13. An apparatus according to claim 8, wherein said correction means performs a shading correction for the image data.

14. An image readout apparatus comprising:
   reading means for reading an image and generating electric data representing the image;
   a reference member;
   memory means for storing reference data obtained with reading said reference member by said reading means;
   correcting means for correcting image data obtained with reading an original document by said reading means on the basis of the reference data stored in said memory means; and
   control means for allowing said reference member to be read by said reading means and allowing the reference data to be stored in said memory means when a predetermined time has elapsed after the end of the reading operation of the original document.

15. An apparatus according to claim 14, wherein when the original document is not at a reading position of said reading means, said control means causes said reference member to be read by said reading means.

16. An apparatus according to claim 15, further comprising feeding means for feeding the original document to the reading position.

17. An apparatus according to claim 15, wherein said reference member is provided at the reading position.

18. An apparatus according to claim 14, wherein said correcting means corrects a digitizing operation for the image data on the basis of the reference data stored in said memory means.

19. An apparatus according to claim 14, wherein said correction means performs a shading correction for the image data.

20. An image readout apparatus comprising:
   reading means for reading an image on an original document at a reading position and generating electric data representing the read image;
   a reference member provided at the reading position;
   memory means for storing reference data obtained by reading said reference member with said reading means;
   correcting means for correcting image data obtained by reading the original document with said reading means on the basis of the reference data stored in said memory means; and
   control means for causing, when the original document is at the reading position before said reference member is read, said correcting means to perform an image data correction by using the reference data if the reference data is stored in said memory means, and for causing said correcting means to not perform the image data correction if the reference data is not stored in said memory means.

21. An apparatus according to claim 20, wherein said correcting means corrects a digitizing operation for the image data on the basis of the reference data stored in said memory means.

22. An apparatus according to claim 20, wherein when the original document is not at the reading position of said reading means, said control means causes said reference member to be read by said reading means.

23. An apparatus according to claim 2, further comprising feeding means for feeding the original document to the reading position.

24. An apparatus according to claim 20, wherein said correcting means performs a shading correction for the image data.

25. An image readout apparatus comprising:
reading means for reading an image and generating electric data representing the image;
a reference member;
memory means for storing reference data obtained by reading said reference member with said reading means;
correcting means for correcting image data obtained by reading an original document with said reading means;
storage means for storing indication data representing that the reference data is stored in said memory means; and
control means for controlling said correcting means such that when the indication data has been stored in said storage means, said correcting means performs an image data correction on the basis of the reference data stored in said memory means,
wherein the indication data in said storage means is reset when a supply of electric power to said apparatus starts.

26. An apparatus according to claim 25, wherein said correcting means corrects a digitizing operation for the image data on the basis of the reference data stored in said memory means.

27. An apparatus according to claim 25, wherein when the original document is not at a reading position of said reading means, said control means causes said reference member to be read by said reading means.

28. An apparatus according to claim 25, wherein said reference member is provided at a reading position of said reading means.

29. An apparatus according to claim 28, further comprising feeding means for feeding the original document to the reading position.

30. An apparatus according to claim 25, wherein said correcting means performs a shading correction for the image data.

31. An image readout apparatus comprising:
reading means for reading an image at a reading position and generating electric data representing the image;
feeding means for feeding a plurality of original documents to the reading position, one by one;
a reference member provided at the reading position;
memory means for storing reference data obtained by reading said reference member with said reading means, after completion of reading of a preceding original document and before start of reading of a succeeding original document;
correcting means for correcting image data obtained by reading respective ones of the plurality of original documents with said reading means, on the basis of the reference data stored in said memory means; and
control means for causing said correcting means to correct the image data to the succeeding original document on the basis of the reference data used to correct the image data of the preceding original document, when the succeeding original document is at the reading position before reading of said reference member.

32. An apparatus according to claim 32, wherein said correcting means corrects a digitizing operation for the image data on the basis of the reference data stored in said memory means.

33. An apparatus according to claim 32, wherein when the original document is not at the reading position, said control means causes said reference member to be read by said reading means.

34. An apparatus according to claim 32, wherein said correcting means performs a shading correction for the image data.

* * * * *

UNITED STATES PATENT AND TRADEMARK OFFICE
CERTIFICATE OF CORRECTION

PATENT NO. : 4,870,501  
DATED : September 26, 1989  
INVENTOR(S) : Yoshida

Page 1 of 3

It is certified that error appears in the above-identified patent and that said Letters Patent is hereby corrected as shown below: ON TITLE PAGE:

[75] INVENTOR:
   change "Tekehiro Yoshida," to --Takehiro Yoshida--.

SHEET 4 OF 14,
   Box 68, change "ORIGINA" to --ORIGINAL--.

COLUMN 3,
   Line 62, change "than" to --more than--.

COLUMN 5,
   Line 26, change "the" to --a--.

COLUMN 7,
   Line 31, change "original document unit 68" to --original document feeding unit 68--.

COLUMN 8,
   Line 55, change "on" to --to--; and
   Line 56, change "to" to --on--.

COLUMN 11,
   Line 12, change "A" to --An--;
   Line 29, change "the jam of" to --a jam of the--;
   Line 58, close up right margin; and
   Line 59, close up left margin.

COLUMN 13,
   Line 5, delete "level", (first occurrence).

COLUMN 14,
   Line 11, change "reached" to --reach--.

UNITED STATES PATENT AND TRADEMARK OFFICE
CERTIFICATE OF CORRECTION

PATENT NO. : 4,870,501

DATED : September 26, 1989

INVENTOR(S) : Yoshida

It is certified that error appears in the above-identified patent and that said Letters Patent is hereby corrected as shown below:

COLUMN 15,
Line 38, change "o" to --to--.

COLUMN 16,
Line 34, change "a" to --the--;
Line 51, change "the" to --a--;
Line 60, change "the high-speed readable apparatus or the" to --a high-speed read apparatus or--;
Line 61, change "for use" to --used--; and
Line 65, change "in" to --if--, and change "such" to --is such--.

COLUMN 17,
Line 7, change "claimed" to --claim--;
Line 13, change "with" to --by--, and change "by" to --with--;
Line 38, change "into" to --in--;
Line 53, change "with" to --by--, and change "by" to --with--; and
Line 56, change "with" to --by--, and change "by" to --with--.

COLUMN 18,
Line 18, change "with" to --by--, and change "by" to --with--; and
Line 21, change "with" to --by--, and change "by" to --with--.

UNITED STATES PATENT AND TRADEMARK OFFICE
CERTIFICATE OF CORRECTION

PATENT NO. : 4,870,501

DATED : September 26, 1989

INVENTOR(S) : Yoshida

It is certified that error appears in the above-identified patent and that said Letters Patent is hereby corrected as shown below:

COLUMN 19,
  Line 7, change "Claim 2," to --Claim 20,--.

COLUMN 20,
  Line 28, change "to" to --of--.

Signed and Sealed this

Eighth Day of October, 1991

Attest:

HARRY F. MANBECK, JR.

Attesting Officer

Commissioner of Patents and Trademarks